DIGITALIZER AND DIGITAL SERVOMECHANISM

Filed Nov. 1, 1963 7 Sheets-Sheet 1

INVENTOR.
Wright K. Gannett
BY
Merriam, Smith & Marshall
Attorneys

DIGITALIZER AND DIGITAL SERVOMECHANISM

Filed Nov. 1, 1963 7 Sheets-Sheet 2

INVENTOR.
Wright K. Gannett
BY
Merriam, Smith & Marshall
Attorneys

DIGITALIZER AND DIGITAL SERVOMECHANISM

INVENTOR.
Wright K. Gannett
BY
Merriam, Smith & Marshall
Attorneys

DIGITALIZER AND DIGITAL SERVOMECHANISM

Filed Nov. 1, 1963

7 Sheets-Sheet 4

INVENTOR.
Wright K. Gannett
BY
Merriam, Smith & Marshall
Attorneys

INVENTOR.
Wright K. Gannett
BY
Merriam, Smith & Marshall
Attorneys

DIGITALIZER AND DIGITAL SERVOMECHANISM

Filed Nov. 1, 1963 7 Sheets-Sheet 6

INVENTOR.
Wright K. Gannett
BY
Merriam, Smith & Marshall
attorneys

INVENTOR.
Wright K. Gannett
BY
Merriam, Smith & Marshall
Attorneys

3,300,773
DIGITALIZER AND DIGITAL SERVOMECHANISM

Wright K. Gannett, Davenport, Iowa, assignor to Mast Development Company, Inc., Davenport, Iowa, a corporation of Iowa Filed Nov. 1, 1963, Ser. No. 320,697
8 Claims. (Cl. 340—347)

This invention relates to a novel digitalizer and more particularly to a digitalizer using a plurality of wheels or drums in which intermittent gears are used in the connections between drums.

A digitalizer is an electromechanical device which employs a shaft operatively connected to one or more wheels carrying electrically conductive segments contacted by brush systems. In common with other devices of the same type, the digitalizer of the invention can be operated in two modes, in the first of which the digitalizer indicates by means of an electrical output the position to which its shaft has been turned within many revolutions. In the second mode of operation, an electrical input is supplied to the digitalizer which then directs a servomotor to position its shaft to a desired location within many revolutions. The combination of digitalizer, servomotor, and associated control circuits is known as a digital servomechanism.

A type of digitalizer heretofore known comprises two or more wheels or drums, each of which can assume angular positions corresponding to numbers within a given count base. Thus, as an example, in the decimal count base, one wheel contains the numbers 0, 1, 2, 3, 4, 5, 6, 7, 8, and 9, representing the first order of digits, i.e., units, a second wheel contains the same numbers representing the second order, i.e., tens, a third wheel contains the same numbers representing the third order, i.e., hundreds, and so on, depending on the total desired numerical count. It should be understood that, although any count base other than decimal can also be used and in fact may be more useful in a given application, a decimal system is most commonly used and will be assumed throughout the description of the invention, unless otherwise indicated.

In a conventional digitalizer heretofore known, there is provided a reduction gear system between the lowest order, i.e., units, wheel or drum and the second order, i.e., tens, wheel or drum, the gear ratio being such that the higher order wheel moves steadily through one count during each complete revolution of the lower order wheel. With the reduction gear system heretofore used, the tens wheel moves continuously as the units wheel rotates, but at only one-tenth the speed, so that the tens wheel completes one-tenth of a revolution for each revolution of the units wheel. Similarly, the hundreds wheel is geared to move at one-tenth the speed of the tens wheel, or 1/100 the speed of the units wheel. Higher order wheels are geared down in the same manner, each rotating at one-tenth the speed of the immediately lower order wheel.

In the digitalizer of the invention, an intermittent gear arrangement is used between the wheels rather than a conventional step-down gearing arrangement. The intermittent gear system is arranged so that each drum above the lowest order moves only intermittently rather than continuously. Each drum, however, when it does move, moves simultaneously with and at about the same speed as all lower order drums and travels through the same angle to index one count. Except during the time that a drum is actually being driven by the immediately lower order drum (when the lower order drum passes through its 0–9 or 9–0 interval) it remains locked in position. The result of this arrangement is that, disregarding backlash, all drums, even those of high order, have the same coarse resolution for one count of the units wheel. This contrasts with the conventional digitalizer in which the resolution necessary to distinguish a change of one count rapidly becomes extremely small, requiring the use of precision components.

For example, in the digitalizers heretofore known which employed a decimal count base, the coarsest obtainable resolution per count in the units drum is typically 36° (i.e., 360° per revolution divided by 10 counts per revolution). In the tens drum, however, the required resolution decreases to 3.6°, and in the hundreds drum it becomes only 0.36°. Accordingly, in these digitalizers, the hundreds drum must be capable of distinguishing between positions separated by only 0.36° if it is to be capable of distinguishing a change of one count. By the same token, if the total count base is to exceed 1000, the necessary resolution of the highest order drum must be even more precise.

The necessity for precision components of this type is eliminated by means of the construction of the invention. Thus, assuming the use of a decimal count base, even the higher order drums would move (neglecting backlash) 36° when caused to index by a change of one count in the units drum. As an example, when the units drum increased one count to go from 999 to 1000 (or 000), all three drums, i.e., units, tens, and hundreds, move simultaneously through the same gross angle of 36°, thus making the detection of adjacent positions in the tens and hundreds drums as simple as that in the units wheel.

In other aspects, the invention provides either for end-to-end search or for closed-loop search, and for finding the desired position via the shortest route. The invention also provides means for multiple-speed operation in which a high speed is maintained during most of a cycle, with a lower speed used to achieve the final desired location, to avoid overshooting. In another emobdiment, overshooting the desired location at high speed is produced deliberately, followed by backing into the final location at slow speed. Another feature of the invention provides for reversal of the direction of rotation in end-to-end search, described below, when overshoot occurs accidentally at either end of the total count cycle, by means of a "dummy drum."

Other advantages of the invention will be apparent from the following detailed description thereof, taken in conjunction with the accompanying drawings, in which the same numerals are used to indicate like elements in the several views, and in which.

Figure 1:
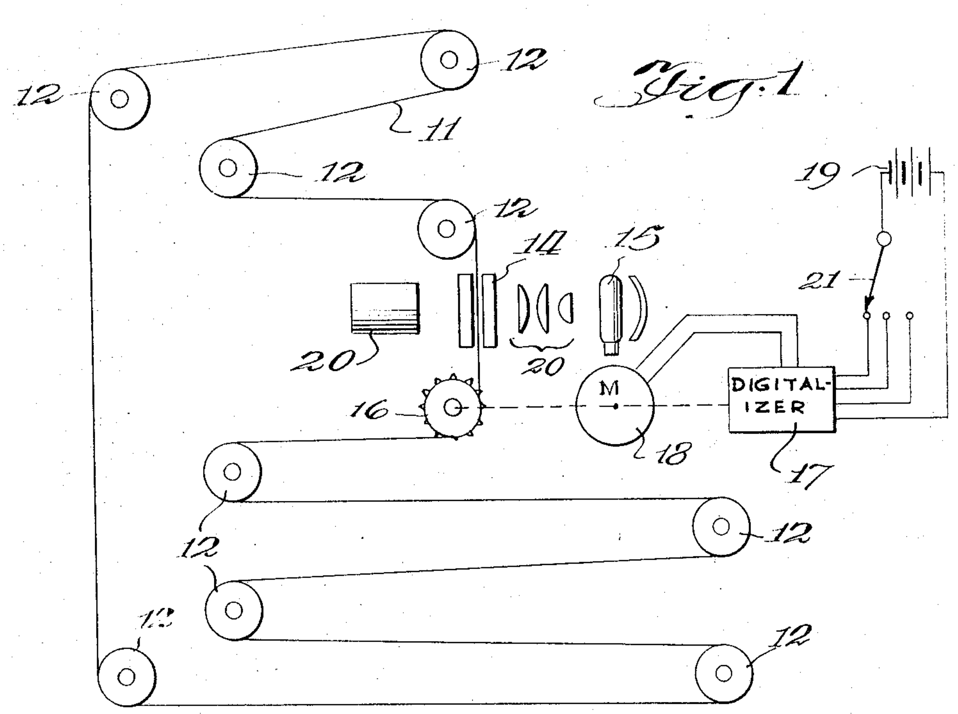
FIGURE 1 is a schematic representation of the manner in which the digital servomechanism of the invention can be used in a closed-loop type of operation in which a desired frame in a closed loop of motion picture film is selected and positioned within a film gate for projection, the servomechanism proceeding to the desired frame by the shortest route.
Figures 2, 3:
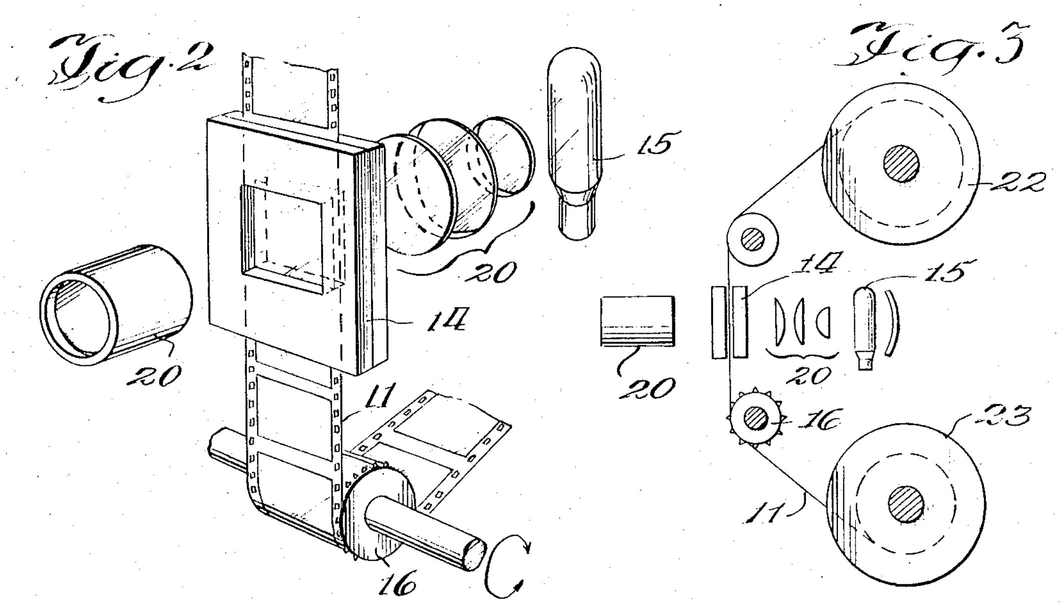
FIGURE 2 is a detail of the film gate and projection system in the apparatus of FIGURE 1 showing the drive sprocket used to position the desired frame for projection.
FIGURE 3 shows a system similar to that of FIGURE 1 in which an end-to-end, rather than a closed-loop, type of operation is employed, the film being wound and unwound in the appropriate direction from two reels.

FIGURES 1 and 2 show a film retrieving and positioning ("address") system in which the digital servomechanism of the invention is used to position a desired frame in a length of photographic film within a film gate for projection by means of a projection system consisting of lamp 15 and lens system 20. The film in this case is in the form of an endless loop 11 which is wound around idler wheels 12 and passes through film gate 14. The film is positioned as desired in the film gate by rotation of sprocket drive wheel 16 in the appropriate direction to position the desired frame within the film gate with the least travel of the film.

The servomechanism of the invention is indicated in FIGURE 1 in a much simplified manner and comprises digitalizer assembly 17, the electrical output of which controls the rotation of servomotor 18, which in turn drives sprocket wheel 16 and the drums (not shown) of digitalizer 17 in order to indicate when the desired position has been reached. The request for a desired film frame is made by introducing into digitalizer 17 an electrical signal indicated schematically in FIGURE 1 by battery 19 through selector switch 21. Selector switch 21, which is indicated in FIGURE 1 as having three positions, is used only to indicate that an element of selection is present at this point. In practice, the switch assembly may consist of a number of rotary or keyboard decade switches, one for each order of digits in the total count base. The principle involved, however, is illustrated by the much simplified circuit of FIGURE 1.

Figure 6:
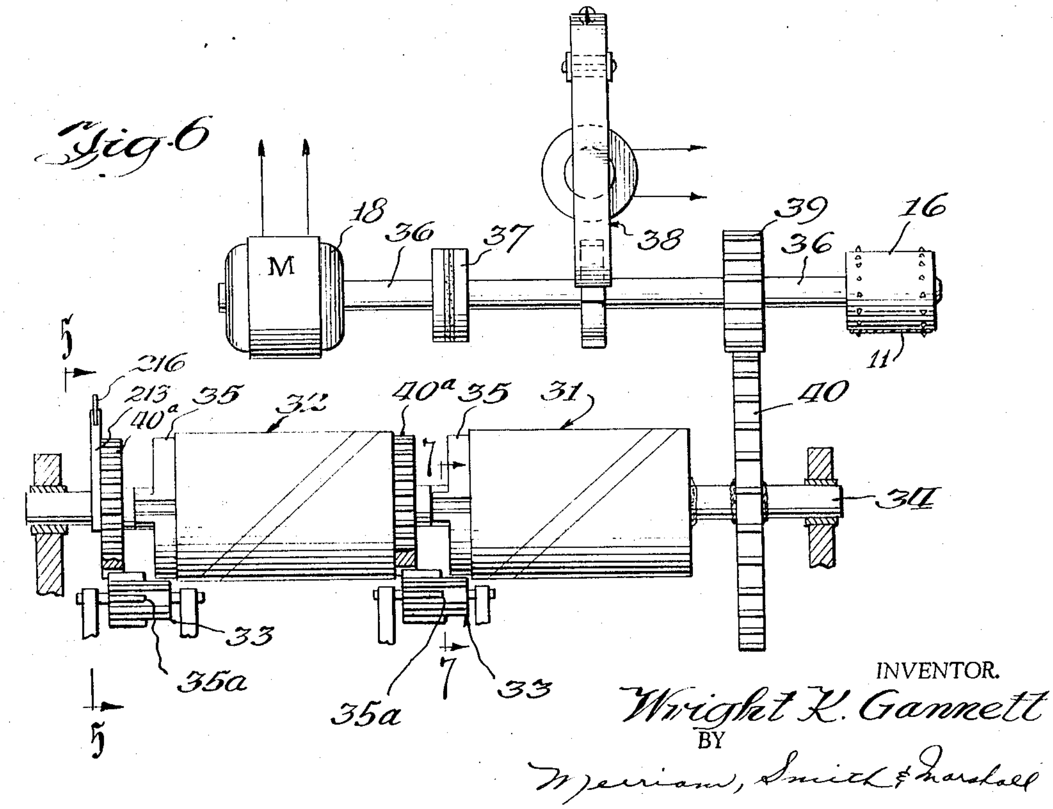
FIGURE 6 is a detail showing one view of the intermittent gearing system used to interconnect drums and also shows the motor driving the film driving wheel of FIGURE 1 and the brake used to stop the driving wheel and position the film exactly within the film gate.
Figures 4, 5:
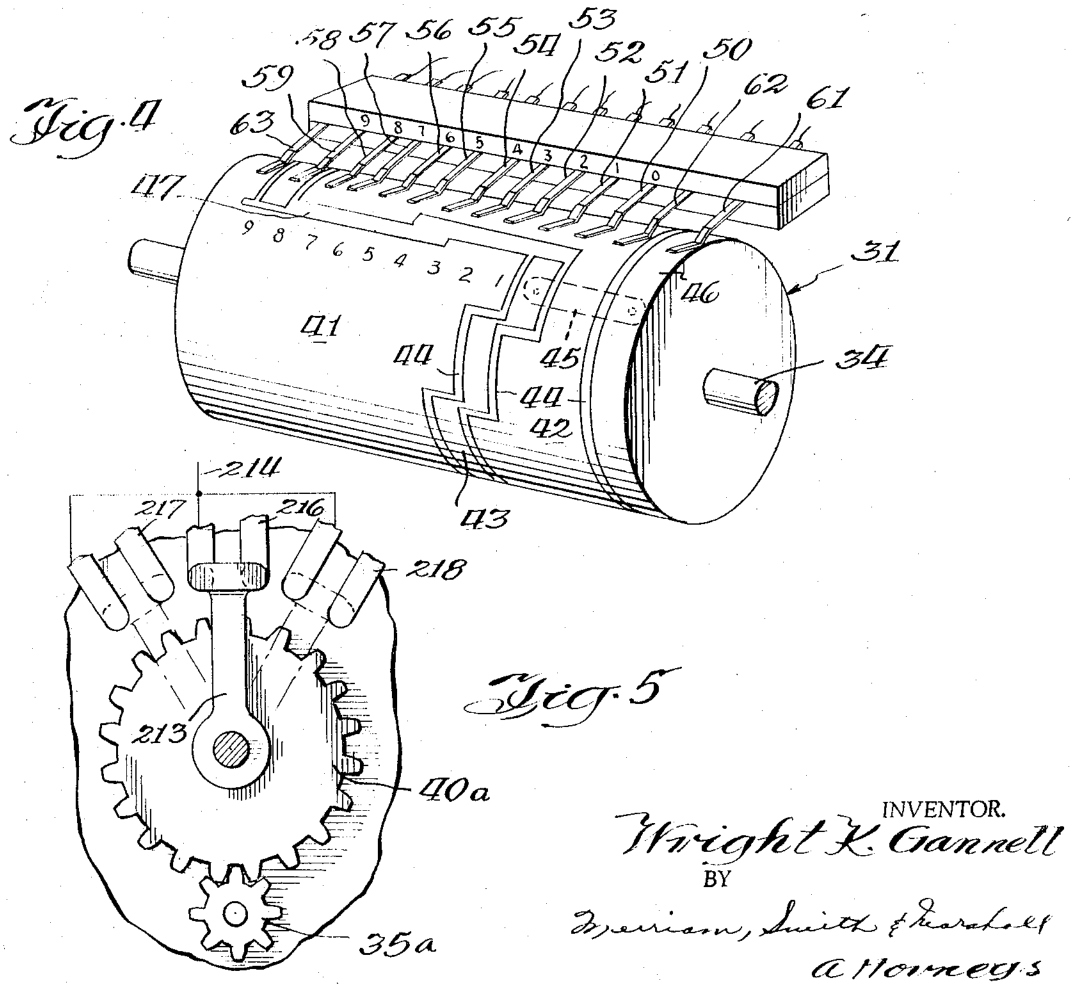
FIGURE 4 is a detail of a typical drum or wheel which can be used singly or in multiple in the digitalizer of the invention, showing multiple brushes contacting a plurality of electrically conducting surfaces on the surface of the drum and the accessory slip rings used in conjunction with appropriate circuits for controlling the operation of the digitalizer.
FIGURE 5 shows a portion of an intermittent gear system, used in this instance as a dummy drum and switching system which is advisably used in conjunction with end-to-end operation of the digital servomechanism in order to avoid difficulty occasioned by overshooting the ends of the count cycle.

As shown in FIGURES 4 and 6, the digitalizer of the invention comprises a plurality of drums, (e.g., 31, 32) which are mounted for rotation, e.g., on shaft 34, and are capable of being rotated between discrete positions, each of which is displaced by a constant angle from the adjacent positions, the angle being 36° in the case of a decimal count base which is herein assumed. There are usually used two or more such drums, depending on the total desired count cycle, which increases by a power of 10 for each additional drum. The lowest order drum, e.g., 31, is integrally connected to shaft 34, whereas all drums of higher order have no direct connection (except through intermittent gear system 33) with this shaft, so that these higher order drums are free to idle (i.e., remain stationary) as the shaft and the lowest order drum turn. Drums of adjacent order (e.g., 31, 32) are interconnected by means of an intermittent gear system 33 which causes a higher order drum (e.g., 32) to index (i.e., pass from one discrete position to an adjacent discrete position) every time the immediately lower drum (e.g., 31) completes a rotation and passes through its 9–0 step or interval in either direction.

Intermittent gear system 33 comprises one-toothed gear 35 (attached to drum 31) and idler gear **35*a*. Gear 35*a* contains eight teeth, with a portion of every other tooth removed, as shown in FIGURE 6. Accordingly, the right end of gear 35*a*, engaging gear 35, has only four teeth, while the left portion has eight teeth which engage gear 40*a* (attached to drum 32**), having twenty teeth.

Figures 7, 8:
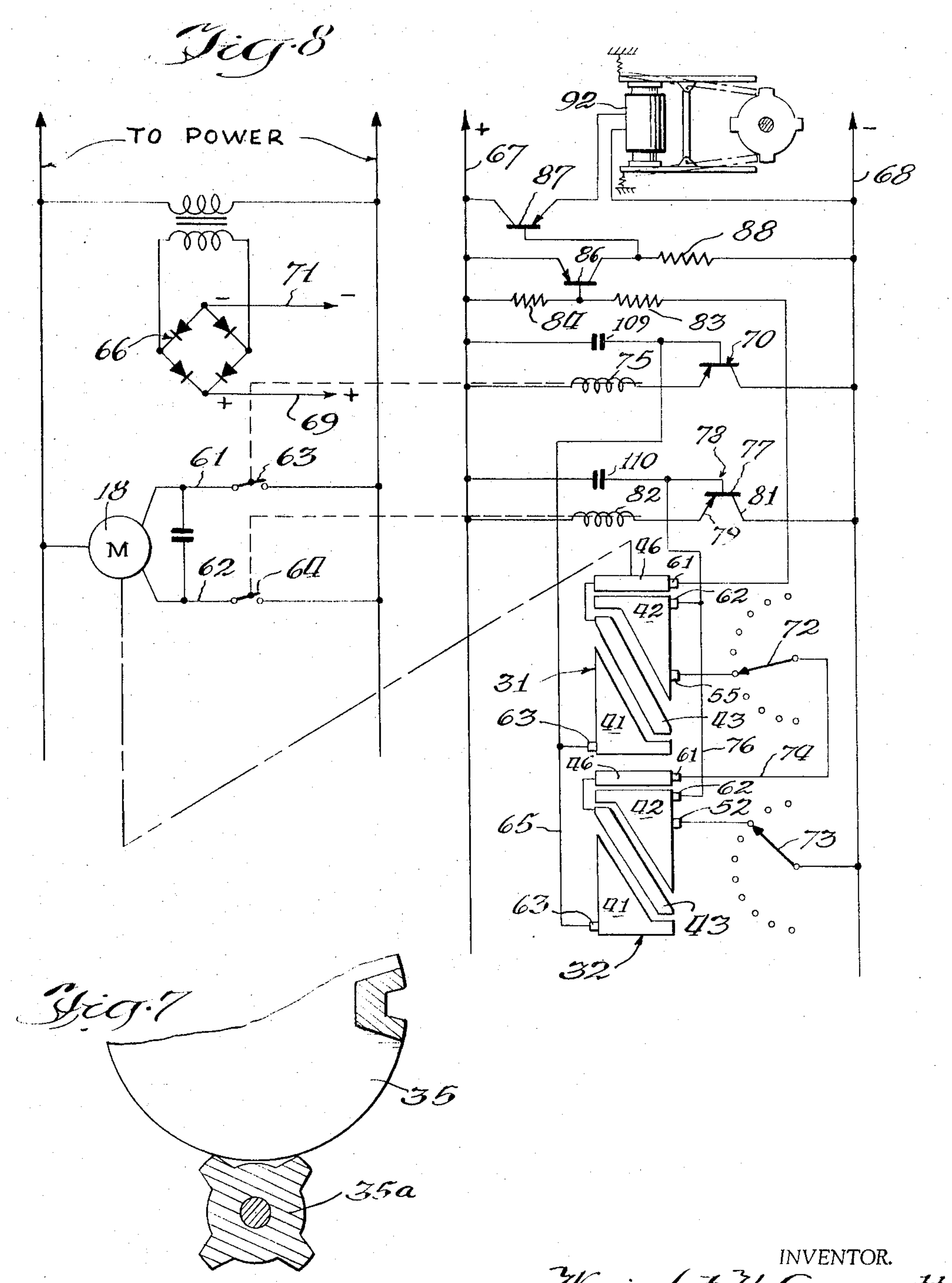
FIGURE 7 is a sectional view along the line 7—7 of FIGURE 6 showing another view of the intermittent gear means used to index a higher order wheel on each complete revolution of the adjacent lower order wheel.
FIGURE 8 is a schematic diagram of a control circuit for a typical method of operation of the digital servomechanism of the invention, in which two drums are used.

As shown in FIGURE 7, for the greatest portion of each revolution of gear 35, gear **35*a* (and gear 40*a*) remain locked in position because of the close contact of two adjacent teeth of gear 35*a* with the cylindrical surface of gear 35. As gear 35 continues to rotate, however, its tooth contacts a vertical tooth on the left end of gear 35*a*, causing gear 35*a* to be driven through one-fourth of a revolution. It will be apparent that 20-toothed gear 40*a* and drum 32 are thus driven through one-tenth of a revolution for every complete revolution of gear 35 and drum 31**.

In a similar manner, all drums of higher order are interconnected by means of intermittent gears so each gear of higher order indexes once for each complete revolution of the drum of immediately lower order.

It will be apparent to those skilled in the art that other intermittent drive systems can be used in place of that specifically described for a position of shaft 36 or sprocket drive wheel 16 different from an existing position. Motor 18 drives the units drum through gears 39 and 40. The units drum in turn drives the tens drum which in turn drives the succeeding higher order drums through the intermittent gear mechanisms, e.g., 33, which interconnect these drums. When the desired position is reached, motor 18 is de-energized and brake system 38 is activated to stop rotation of shaft 36 and drive wheel 16 quickly as possible, clutch 37 permitting motor 18 to coast to a stop.

Figure 14:
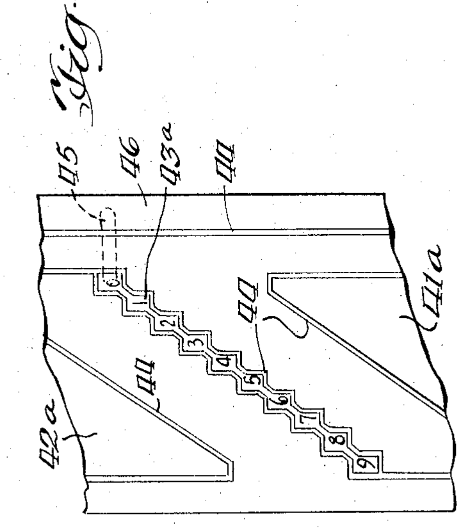
FIGURE 14 is a development of the surface of the highest order drum in a system for closed-loop operation.
Figure 15:
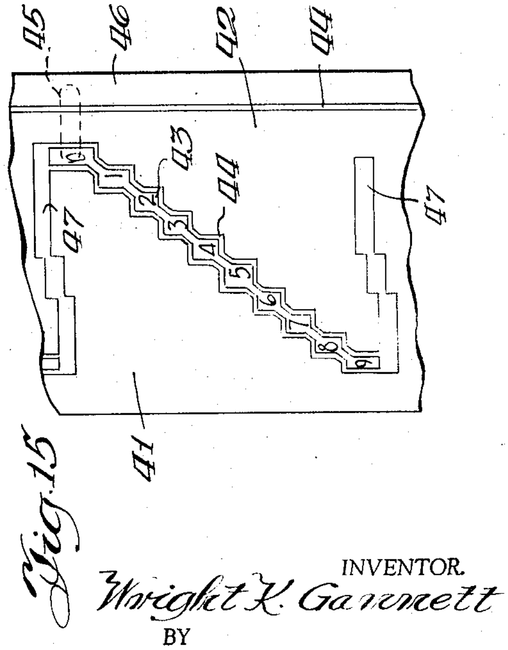
FIGURE 15 is a development of the surface of all drums in end-to-end operation and of all drums but the highest order in closed-loop operation.

As shown in FIGURE 4 and in the developed surfaces shown in FIGURES 14 and 15, each drum contains on its surface a commutator system comprising at least three electrically conducting surfaces, e.g., 41, 42, and 43, which are electrically isolated from one another by suitable insulation 44 and 47. The shapes of conducting surfaces 41, 42, and 43 depend on the desired mode of operation of the digitalizer and will be discussed in further detail below. (It should be understood that the developed surfaces of FIGURES 14 and 15 contain some overlap which would not exist in the actual drum.)

In general, as shown in FIGURE 4, the commutator surfaces work in conjunction with a plurality of brushes 50–59 on each drum, including one brush for each number in the count base, and in addition brushes 61, 62, and 63 which make continuous contact with surface 43 (through internal jumper 45, which is below the surface of the drum, and slip ring 46), surface 42, and surface 41, respectively, and are used in electrical circuits to control operation of the digitalizer and to "pass on" the control of rotation from the highest order drum successively to each lower order drum in turn as each arrives at its null position, as will be hereinafter described.

In operation, a certain brush among those corresponding to numbers in the count base is selected as the "live" brush for each drum, the combination of brushes which is so selected representing a number which designates a desired final resting place for shaft 36 (FIGURE 6). By means of control circuits to be described, motor 18 is energized and remains energized until each drum rotates to a position in which its "live" brush acts in cooperation with the "live" brushes on the other drums and with the conducting surfaces of the drums to de-energize motor 18, thus signifying that the desired position has been reached.

There are, in general, two modes of operation for a digitalizer of this type, end-to-end operation and looped operation. End-to-end operation (e.g., as shown in FIGURE 3, in which the free ends of film 11 are wound on reels 22 and 23) may be analogized to positioning a rack by means of a pinion, while in looped search (shown in FIGURE 1) the ends of the pinion may be considered joined to form a ring gear. It will be seen, for example, that if the length of the rack is considered as representing the numbers 0 to 999, substantially the entire length of the rack must be covered in order to go from position 1 to position 999 in end-to-end operation. In looped operation, however, the same distance can be covered very quickly by going in the opposite direction through the intervening number 0.

The mechanism of the invention can be made to operate in end-to-end or in looped fashion depending on the configuration of the commutator surfaces on the drum of highest order. For looped search the surface of only the highest order drum has a configuration shown in developed form in FIGURE 14. A series of electrically connected null positions (the "null gap," i.e., surface 43*a*) extends diagonally across the drum surface, each position of which cooperates with a brush 50–59 (FIGURE 4) representing a numeral. All drums other than the highest order drum have the surface configuration shown in FIGURE 15. When the "live" brush of the highest order drum is in contact with either of surfaces 41*a* or 42*a*, rotation of the drum is called for, in a direction such that the brush will arrive at the null gap 43*a* without coming in contact with the other surface (i.e., the rotation is toward null in the shortest direction). Thus, if contact of the "live" brush with surface 41*a* causes clockwise rotation, contact with surface 42*a* causes counterclockwise rotation. Furthermore, the entire surface of the drum is divided in such a manner that not more than one-half turn of the drum in the proper direction is required to cause the "live" brush to come into the null gap 43*a*.

If the "live" brush of the highest order drum is not in its null gap, that drum alone controls the rotation of motor 18, i.e., the conducting surfaces on all lower order drums are effectively removed from the motor control circuit. When the highest order drum arrives at null, however, control of rotation is effectively passed on from the null conductive strip 43*a* through jumper 45, slip ring 46, and contact 61 (FIGURE 4) to the next order drum which then alone controls rotation of the motor. In this way, each of the drums arrives at its null consecutively, starting with the highest order drum, until the lowest order also achieves null, indicating that the position originally called for has been reached, at which time motor 18 is de-energized.

For end-to-end search, all drums, including the highest order, have the surface configuration shown in FIGURE 15, in which contact of the "live" brush with surfaces 41 and 42 on opposite sides of null gap 43 cause rotation in opposite directions, such that the "live" brush will come into the null gap 43 without crossing insulating gap 47. It will be seen in this case, however, that under certain circumstances the highest order drum must rotate almost a complete turn, representing substantially the entire count cycle of the digitalizer, before null is reached.

Typical operation of the invention will be described in conjunction with the circuit of FIGURE 8 which depicts schematically a mechanism having two drums, 31 and 32, arranged for end-to-end search. As shown in the figure, motor 18 is mechanically coupled to the drums as well as to any other mechanism or agency the position of which it is desired to indicate or control, such as, for example, drive wheel 16 used to position the film in the system of FIGURE 1. Such other mechanism, however, forms no part of the invention per se and is not shown in FIGURE 8. Suitable methods for coupling motor 18 for achieving the desired result in any given case will be apparent to those skilled in the art.

Motor 18 is capable of operation in either direction, depending on which of conductors 61 or 62 is used thorugh relay contacts 63 or 64 to complete the circuit to power lines A—A. Also shown in the figure is a conventional full wave rectifier 66 which provides a suitable D.C. voltage for operation of the digitalizer shown on the right side of the figure. It will be understood that the bus lines 67 and 68 on the right side of FIGURE 8 are connected to the output lines 69 and 71 of the full wave rectifier.

The selection of a position of the shaft (not shown) of motor 18 different from that existing at any time is made by suitable manipulation of rotary switches 72 and 73, of which one is provided for every drum and therefore for every order of digits in the total desired count cycle. Rotation of the switch to a desired number connects a brush, e.g., 52 and 55, associated with that number (e.g., "25") into the circuit, thereby designating that brush as the "live" brush. In FIGURE 8, the lines and brushes corresponding to the remaining nine digits which have not been selected have been omitted from the figure in the interest of simiplicity. It will be understood, however, that each position of each rotary switch is connected to a brush similar to those shown in FIGURE 4. In addition to the brush corresponding to the selected digit, each drum contains a brush 62 (FIGURE 4) making continuous contact with surface 42 of the drum which, if included in a complete circuit, would call for (for example) clockwise rotation of motor 18 and a brush 63 connected to surface 41 through which counterclockwise rotation of the motor is achieved. Null strip 43 on each drum is connected to slip ring 46 and brush 61. It will be seen that the null strip 43 of the higher order drum 32 is connected to the selector switch 72 of the next lower order drum by conductor 74. This sequence from the null strip of the higher order drum to the selector switch of the adjacent lower order drum would be repeated if more drums were used.

Operation of the digital servomechanism proceeds as follows. Assuming that contact 52 of drum 32 is not standing on its null strip, a circuit is completed, as shown in FIGURE 8, from one side 68 of the line through switch 73, contact 52, surface 42, contact 62, and conductor 76 to the base of transistor 78 and through the emitter 79 of this transistor to relay coil 82 and the other side 67 of the line. Transistor 78 acts as a switch which, when energized by completion of the circuit as described, permits the passage of additional current from line 68, through the collector 81 of the transistor, and through relay coil 82 to cause the relay to close contact 64, thereby connecting motor 18 across the line for rotation in a counterclockwise direction. In a similar manner, if brush 52 originally contacted surface 41, the circuit would be completed for clockwise rotation, through brush 63, conductor 65, transistor 70, and relay coil 75 which closes switch 63.

Motor 18 is directly coupled to the lower order drum 31 which in turn is connected to drum 32 by means of the intermittent gear means 33 previously described (FIGURE 6), but not shown in FIGURE 8, causing drum 32 to index once for every complete rotation of the lower order drum 31.

The position of the conducting surfaces of drum 32 and the direction of rotation of the motor are selected such that activation of the motor turns the drum in such manner as to position the "live" brush (i.e., 52) in null strap 43. When rotation of the drum has proceeded sufficiently that brush 52 is in contact with null strip 43, the previously established circuit through surfaces 41 or 42 is broken and a new circuit through null strip 53, slip ring 46, brush 61, conductor 74, and selector switch 72 (associated with drum 31) and the designated "live" brush 55 for the lower order (units) drum 31, is now established. In this way, the higher order drum, having achieved its designated position, now "passes on" the responsibility for control of rotation to the immediately lower order drum.

Although units drum 31 now effectively controls the rotation of motor 18, the rotation will continue in the same direction as that originally established by higher order drum 32 (or the highest order drum if three or more drums had been used). This result follows from the fact that the highest order drum is brought into its null by a one-step index which occurs when the adjacent lower order drum passes its 9–0 interval in either direction. During this interval, all the brushes on the lower order drum (which is always of the type shown in FIGURE 15) cross insulated gap 47 and contact a drum surface (i.e., either 41 or 42) which produces continued rotation in the same direction.

With the higher order drum 32 stationary at its null position, rotation of the lower order drum 31 by motor 18 continues until the selected "live" brush of drum 31 also comes into contact with its null strip, at which time the circuit is completed across the line through selector switches 72 and 73, null strips 43 and associated slip rings 46 and brushes 61 of each drum in series with resistors 83 and 84. Simultaneously with the establishment of this circuit, the previously existing circuit through transistor 70 or transistor 78 resulting in energization of motor 18 is opened, removing power from motor 18. Because of the motor's inertia, however, it would continue to rotate, for a short time, thus making precise positioning of quick stopping of the shaft of the motor when the desired location is reached, suitable braking means are supplied which are activated when the circuit is completed through the null strips of all the drums.

The embodiment of FIGURE 8 employs a braking mechanism similar to that shown in FIGURE 12 and described below, in which current through braking coil 92 is cut off to actuate the brake. In FIGURE 8, transistors 86 and 87 and resistors 83, 84, and 88 constitute an inverter circuit which de-energizes coil 92 to brake the shaft when the desired position is achieved, as signified by completion of the circuit through the null strips 43 of drums 31 and 32.

In FIGURE 8, capacitors 109 and 110 connected from one side of the line 67 to the base of transistors 70 and 78, respectively, are provided in order to insure continued operation of motor 18 sufficient to achieve a one-step change, even if the activation of these transistors is extremely short. Once the transistor is activated to cause rotation of motor 18, the capacitors insure that the activation will continue for sufficient time to achieve at least a one-step change, even if the circuit which provides the initial activation has been broken.

Figure 11:
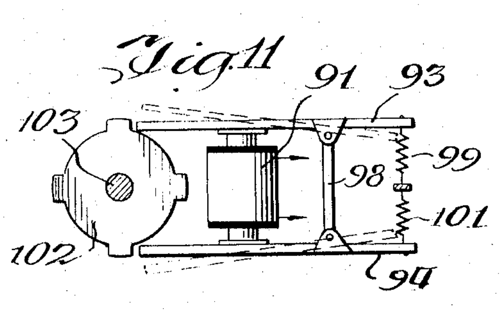
FIGURE 11 shows a means for activating the braking mechanism for accurate positioning of the film in FIGURE 1, the brake being activated when a coil is energized.
Figure 12:
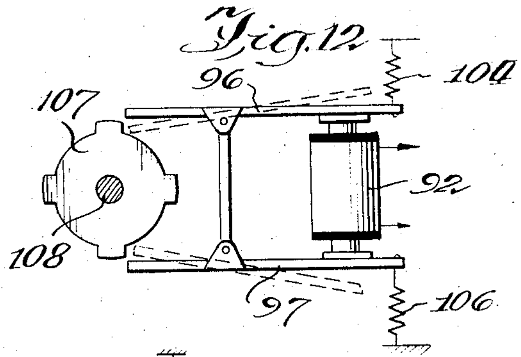
FIGURE 12 is an alternative braking system in which the brake is activated when the coil is de-energized.

Typical braking mechanisms which can be used in the invention are shown in FIGURES 11 and 12. In each case, the mechanism comprises a coil (e.g., 91 or 92) which when energized actuates pawls 93 and 94 in FIGURE 11 and 96 and 97 in FIGURE 12. In the embodiment of FIGURE 11, pawls 93 and 94 are hinged at the ends of spacer bar 98 and, when coil 91 is not activated, are held in the positions shown by the dotted lines by the action of springs 99 and 101, so that four-toothed gear 102, which is mounted on the shaft, e.g., 103, of a motor is free to rotate without interference. When coil 91 is activated, however, it attracts the pawls and holds them in the position shown by the solid lines, thus engaging two opposite teeth of gear 102 and causing a rapid stopping of shaft 103.

The embodiment shown in FIGURE 12 operates in a similar manner except that springs 104 and 106 cause pawls 96 and 97 to assume the positions shown in the dotted lines when coil 92 is in a deactivated condition. When coil 92 is activated however, pawls 96 and 97 are pulled against the influence of springs 104 and 106 to provide sufficient clearance for the free rotation of gear 107 and shaft 108. It will be seen, therefore, that whereas the embodiment of FIGURE 11 brakes the shaft when coil 91 is activated, the embodiment of FIGURE 12 effects a braking action when coil 92 is deactivated. Other circuits suitable for energizing the brake on arrival at null will be apparent to those skilled in the art, and per se form no part of the present invention.

Although the invention is equally operative when the coil in the braking mechanism is energized or de-energized to actuate the brake, the preferred embodiment comprises that in which the coil is de-energized for braking action. In typical operation of the digitalizer of the invention, the braking coil is usually de-energized most of the time, so that it can be designed for intermittent rather than continuous duty. Accordingly, a relatively larger and stronger coil can be used to permit the achievement of more positive braking and therefore higher operating speeds.

Figure 9:
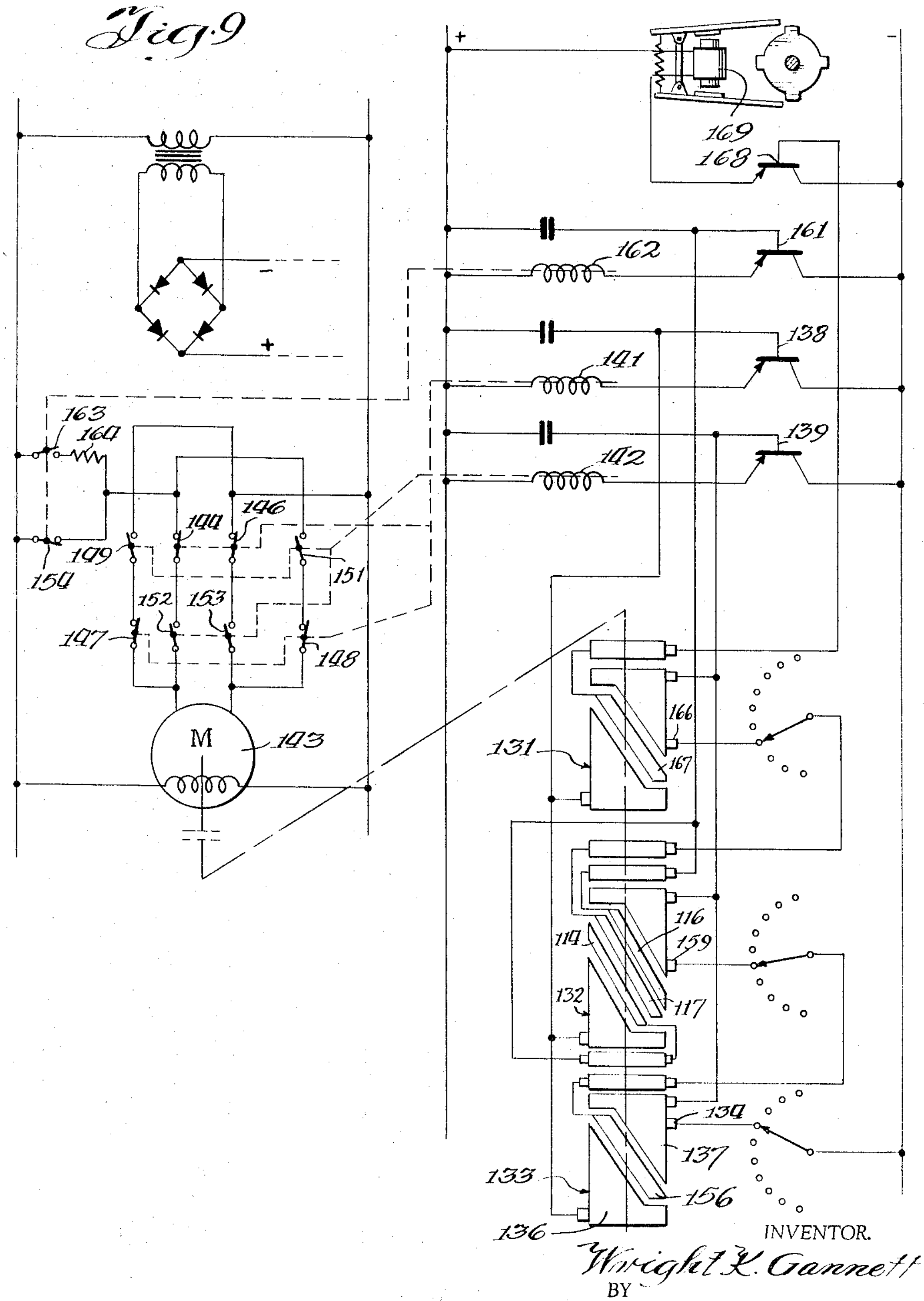
FIGURE 9 is a schematic diagram of a system in which a speed control is provided to slow down the operation as null is approached.
Figure 13:
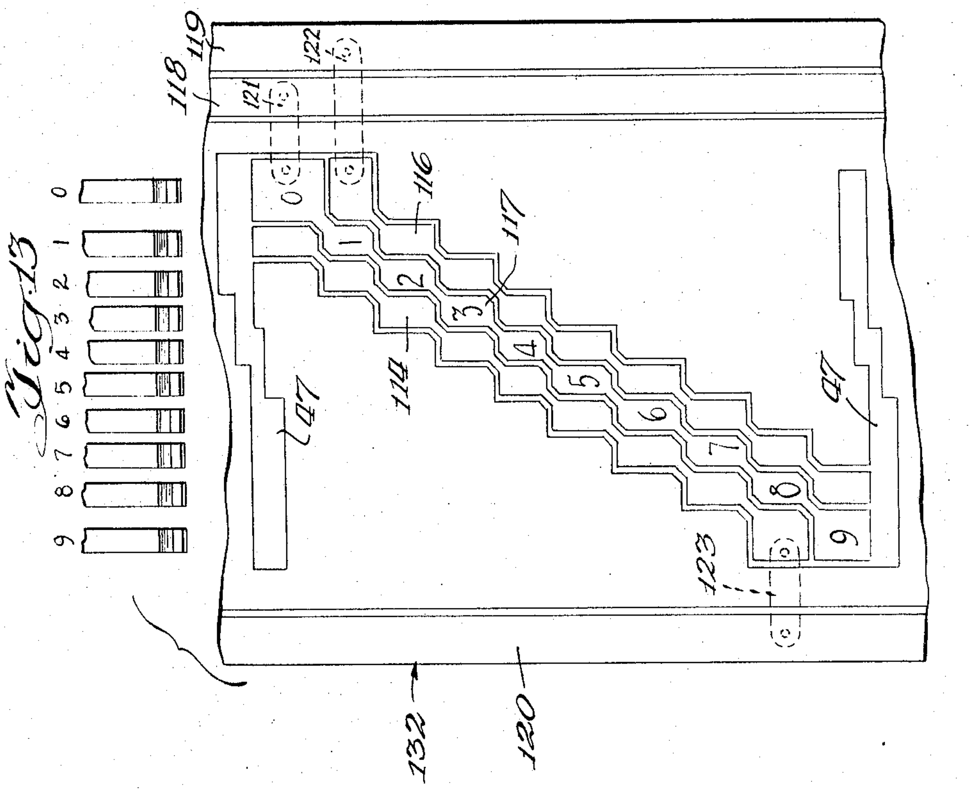
FIGURE 13 is a developed view of the surface of a drum used in conjunction with the circuit of FIGURE 9 for a two speed system.

FIGURE 9 illustrates an embodiment of the invention which employs a two-speed system, in which a relatively high speed of motor rotation is used until a close approach to null is made, at which time the system automatically slows down and moves into null at a slow rate. The major distinctions between this circuit and that of FIGURE 8 lie in the configuration of the conducting surfaces of the second order (tens) drum 132 and in the associated relay control system. A development of the surface of drum 132 used for the second order drum is shown in FIGURE 13. It will be seen that the general configuration of this drum is similar to that of the standard search drum used in all drums of the embodiment of FIGURE 8, and in the third order (hundreds) drum 133 and first order (units) drum 131 of FIGURE 9. The surface of the tens drum 132 shown in FIGURE 13 is provided with additional conducting segments 114 and 116 which are similar to and lie on either side of the null strip 117. The null strip 117 and each of "slowdown" strips 114 and 116 are connected to its associated slip ring (i.e., 118, 120, and 119, respectively) by means of internal jumper connections 121, 123, and 122, respectively.

The general operation of the slowdown circuit of FIGURE 9 is similar to that of FIGURE 8. The embodiment of FIGURE 9 contains three drums, consisting of units drum 131, tens drum 132, and hundreds drum 133. As in the case of the embodiment shown in FIGURE 8, hundreds drum 133 operates in conjunction with brush 134 and either of conducting surfaces 136 or 137 to activate one of transistors 138 or 139, which in turn actuate one of relays 141 or 142 to produce rotation of motor 143 in a clockwise or a counterclockwise direction as desired, by suitable activation of switches 144, 146, 147, and 148 (controlled by relay 141) and of switches 149, 151, 152, and 153 (controlled by relay 142). Each of switches 144–153 in FIGURE 9 is shown in the position it assumes when its associated relay is inactivated. In each case, when the relay is activated, a normally open switch will close whereas a normally closed switch will open. By tracing out the rotation control circuit of FIGURE 9, it will be seen that activation of relays 141 and 142 produce rotation of motor 143 in opposite directions, through switch 154 which is in the normally closed position shown.

When, after suitable rotation of hundreds drum 133, brush 134 makes contact with null strip 156, the responsibility for direction control thereby passes to tens drum 132 in a manner previously explained. It will be seen, however, that drum 132 contains extra slowdown strips 114 and 116 on either side of its null strip 117, as previously described in conjunction with FIGURE 13. When brush 159 on drum 132 makes contact with either of these slowdown strips, transistor 161 is activated to actuate relay 162, which in turn opens switch 154 and closes switch 163 to introduce resistor 164 in series with motor 143, causing the speed of rotation of this motor to be decreased so that the null position of drum 132 is reached at a slower speed than that which previously had existed.

When brush 159 of drum 132 makes contact with null strip 117, the responsibility for further directional control is passed on, as previously explained, to units drum 131. When "live" brush 166 of drum 131 makes contact with its null strip 167, transistor 168 is activated to energize braking coil 169 in a manner previously explained.

It will be seen, therefore, that the embodiment of FIGURE 9 permits a two-speed mode of operation in which the initial relatively high speed of operation is maintained until null is closely approached, at which time the unit automatically switches to a lower speed operation at which the ultimate null is reached.

The slowdown interval in the embodiment of FIGURE 9 varies from 10 to 19 counts. Faster operation can be achieved with a fixed slowdown interval which is achieved in an "overshoot" embodiment of the invention shown in FIGURE 10.

Figure 10:
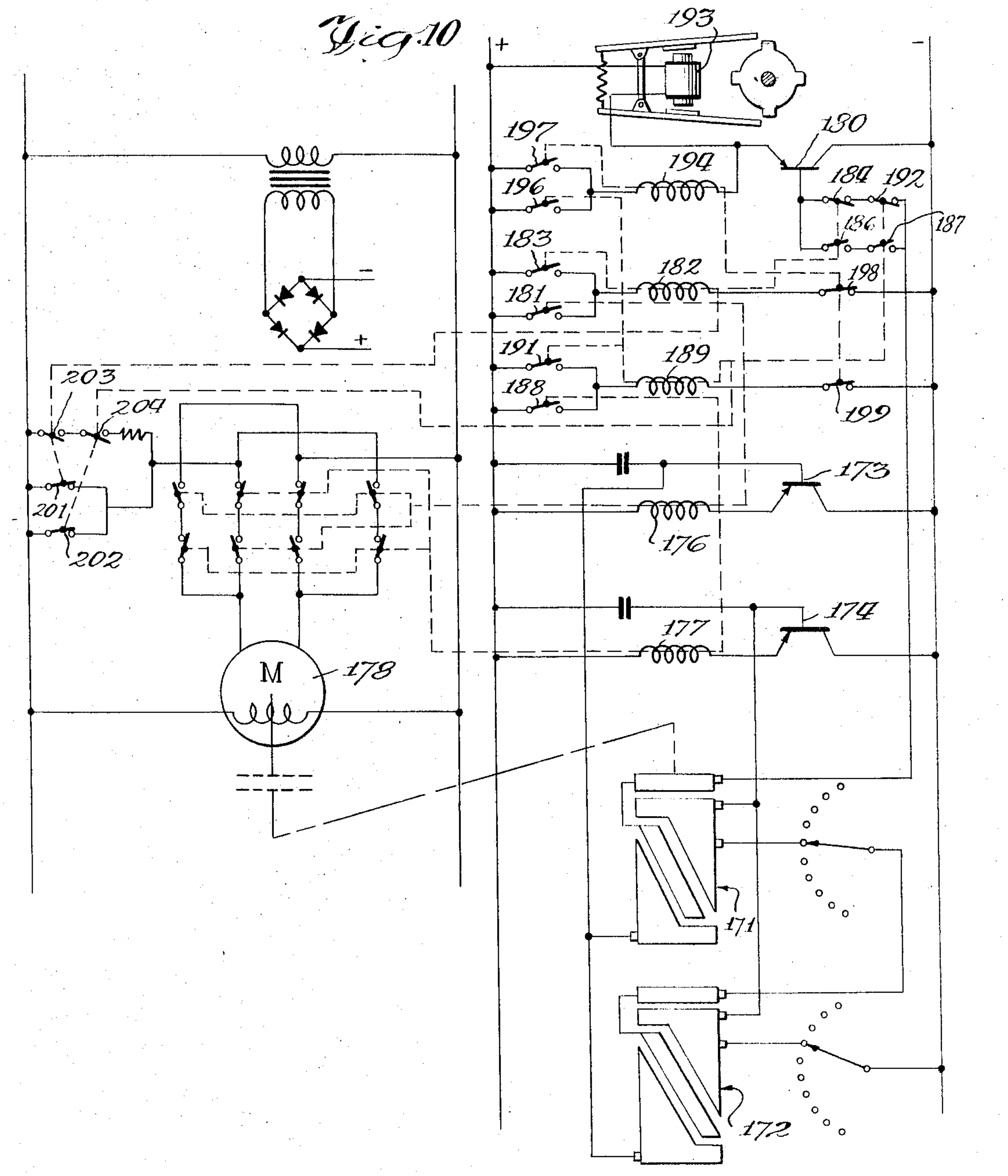
FIGURE 10 is a schematic diagram of a system in which a high speed mode of operation including deliberate overshoot is provided, the mechanism then backing into the desired position at slow speed.

In the embodiment of FIGURE 10, a two-speed overshoot type of system is provided in which null is deliberately overshot at high speed in one direction, after which the system automatically reverses rotation at a lower speed and backs into null. Much of the system shown in FIGURE 10 is the same as that shown and described in other embodiments and will not be described in detail. Thus, units drum 171, tens drum 172, transistor 173 for clockwise rotation, transistor 174 for counterclockwise rotation, relay coils 176 and 177 and the switches controlled thereby for producing reversal in rotation of motor 178 are substantial duplicates of the corresponding components in the embodiments of FIGURES 8 and 9 and operate in essentially the same manner.

In order to illustrate the operation of the embodiment of FIGURE 10, it will be assumed that an order has been put into the control box calling for operation in a clockwise direction. A circuit is completed through the appropriate segment of tens drum 172 to the base of transistor 173, which is activated to cause current to flow through relay coil 176, as a result of which switch 181 closes, causing the activation of relay coil 182 which in turn closes switch 183, thus maintaining coil 182 in an activated condition regardless of the position of switch 181 thereafter so long as switch 198 remains closed. Activation of coil 182 simultaneously causes the opening of switch 184 and the closing of switch 186. It will be seen, therefore, that the circuit across the line including stop coil 193 and the base of transistor 180 will not be completed even when the brushes of drums 171 and 172 arrive at their null position because of open switches 184 and 187. Accordingly, motor 178 will continue to rotate past the null position until the opposite conducting surface of drum 172 is reached which calls for rotation in the opposite, i.e., counterclockwise direction. At this time (i.e., after null has been overshot), coil 177 is activated by transistor 174 causing the closing of switch 188 and the activation of coil 189 which remains in an active condition on the closing of switch 191 controlled thereby, so long as switch 199 remains closed. Activation of coil 189 simultaneously causes the closing of switches 187 and 196 and the opening of switch 192 in the circuit connected to the base of transistor 180. Since switches 186 and 187 are now both closed, the circuit will be completed when the nulls of drums 171 and 172 are reached, at which time transistor 180 energizes stop coil 193 to stop rotation. At the same time, coil 194 is energized through closed switch 196. Activation of coil 194 closes switch 197 thereby locking the coil in an activated condition, and at the same time opening switches 198 and 199 to de-energize coils 182 and 189, causing switches 183 and 191 to open preparatory to an order for another null position.

Stop coil 193 will remain energized as long as null is maintained. It should be noted that in the base circuit of transistor 180 the circuit is completed through switches 184 and 192 (both normally closed) or through switches 186 and 187 (normally open but closed when both coils 182 and 189 are activated). When an order for a new position is entered into the apparatus, however, either relay coil 176 or 177 is energized depending on whether the initial rotation is clockwise or counterclockwise and the stop coil circuit is then opened to permit rotation. It will be obvious that, as in the system of FIGURE 8, an inverter could be supplied to de-energize stop coil 193 at null.

In the motor control circuit on the left side of FIGURE 10, the circuit for initial rotation in either the clockwise or counterclockwise direction is completed through switch 201 or switch 202, both of which are normally closed. One of these switches, however, is opened during initial rotation of the apparatus on the activation of either coil 182 or coil 189. Simultaneously with the activation of either of these coils, one of switches 203 or 204 (both normally open) is closed. After overshoot and on reversal of the motor, the other of switches 201 or 202 is opened and the other of switches 203 or 204 is closed, thereby introducing resistance 206 into the motor circuit so that the motor reverses and operates at a slower rate until null is reached.

In the operation of the digitalizer of the invention in an end-to-end mode, there exists a particular problem which may arise if an accidental overshoot of either end of the count cycle occurs. In operations of this type, the highest order drum should rotate not more than one complete revolution in order to cover the entire range. Referring to the drum shown in FIGURE 4, it will be seen that the null position representing zero and that representing nine are immediately adjacent on the circumference of the drum 31, separated by insulating strip 47. This range from zero to nine for the highest order drum obviously encompasses essentially the entire range which the mechanism can cover, and these positions (i.e., the zero and the nine) represent the positions of the highest order drum on opposite ends of the material being positioned. It will further be seen that if, for any reason, the highest order drum does not stop on null when either terminal position is called for, but rather continues so that the live brush crosses insulating strip 47, the conductiing strip which then contacts either the zero brush or the nine brush will cause continued rotation in the same direction for an entire additional revolution of the drum, thus creating a gross error in positioning.

In order to prevent such an undesired occurrence, a further feature of the invention provides a three-position "dummy wheel" switch which is coupled to the highest order drum in the manner of a still higher order drum using an intermittent gear system such as that used to couple the other drums in the system. Such a switching arrangement is shown in FIGURES 5 and 6. It will be seen that the "dummy wheel" switch comprises gears 35, 35*a*, and 40*a*, previously described, arranged to drive switching bar 213, which in normal operation of the device has the position shown, in FIGURE 5, i.e., making electrical contact between conductor 214 and conductor 216. In the event, however, that the highest order drum completes one full revolution, gear 40$a$ is caused to index in one direction or the other, thereby switching the position of bar 213 to complete the contact between conductor 214 and either of conductors 217 or 218, thus bringing about reversal of the direction of rotation in order to avoid an obvious error in positioning.

Figure 16:
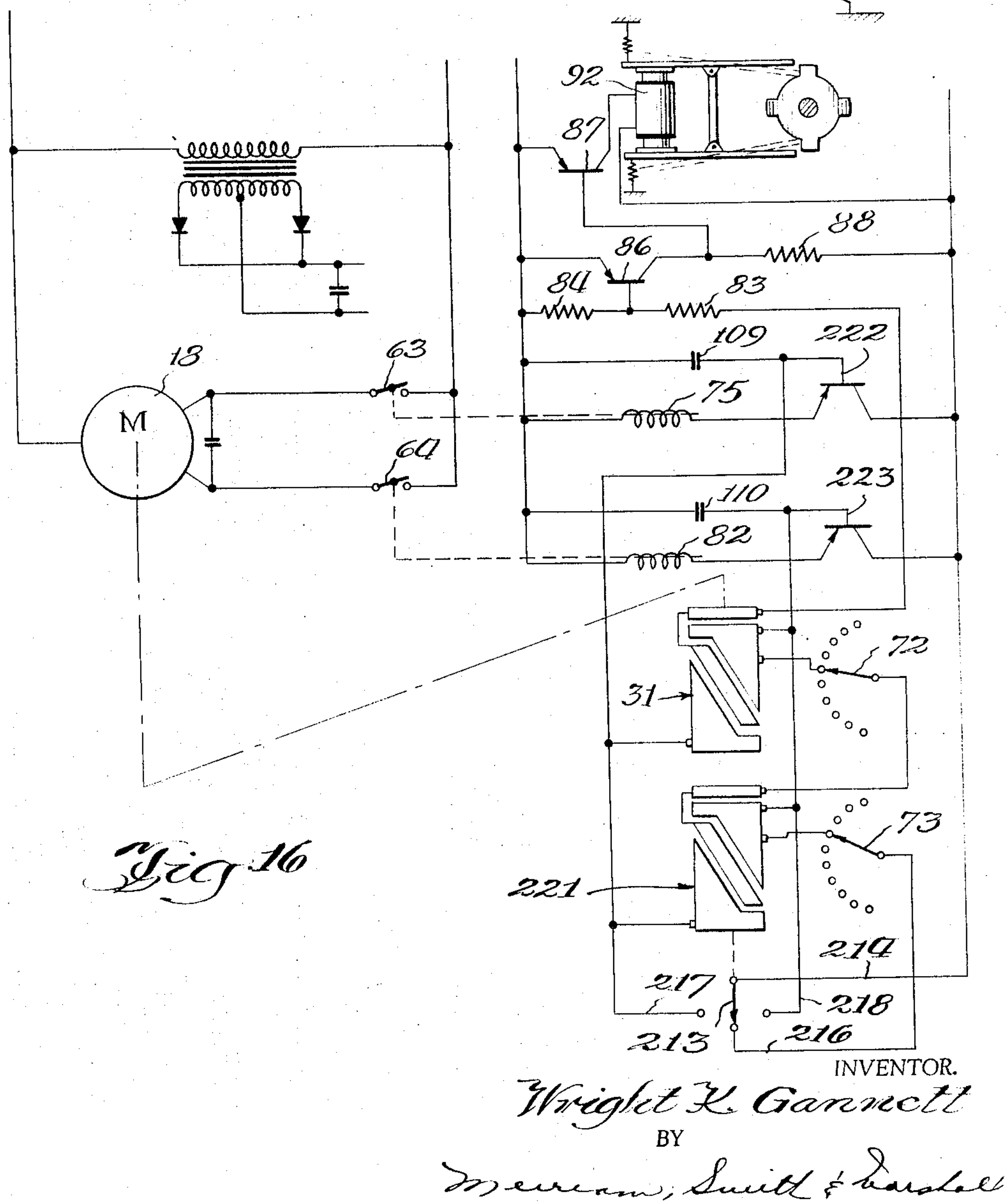
FIGURE 16 is a schematic diagram of an end-to-end search system with provision for reversal of direction in the event of accidental overshoot beyond either end of the count cycle.

FIGURE 16 discloses a typical embodiment of the invention in which a "dummy wheel" switch is employed. In FIGURE 16, the dummy wheel is depicted as three-position switch 213 which can be used to make contact between conductor 214 and one of conductors 216, 217, and 218. The remaining parts of the embodiment of FIGURE 16 are essentially duplicates of those of FIGURE 8 in which a phase inverter circuit is employed to cause the stop coil to be de-energized at null. During normal operation, switch 213 has the position shown in FIGURE 16, completing the circuit from one side of the line through conductor 214 to conductor 216 and thus to the rotary control switch associated with tens drum 221. In the event, however, that drum 221 makes more than one complete revolution, the dummy wheel represented by switch 213 steps, thus connecting the power directly to either conductor 217 or conductor 218 and thence to transistor 222 or transistor 223 to cause reversal of the direction in which the motor was rotating and thus to bring the tens drum back to its intended null.

The foregoing detailed description has been given for clearness of understanding only, and no unnecessary limitations should be understood therefrom, as modifications will be obvious to those skilled in the art.

What is claimed is:

1. In a digital servomechanism, a plurality of drums, each of said drums being mounted for rotation about its axis to a plurality of discrete positions with consecutive positions differing by a constant angular displacement, the consecutive discrete positions of a drum representing consecutive digits within an order of digits, each such drum representing a different order; intermittent gear means interconnecting drums of adjacent orders for causing a drum to index from one of its discrete positions to a next adjacent position on every full rotation of the drum of immediately lower order; a rotatable shaft the angular position of which within a plurality of rotations thereof is represented by a multiple digit number, each digit of which is contained within an order represented by one of said drums; motor means for rotation of said shaft in either direction, said motor being also operatively connected to the drum of lowest order to cause said drum to rotate when said motor means is energized and indirectly to cause the indexing of drums of higher order through the agency of said intermittent gear means interconnecting said drums; commutator means carried on the surface of each of said drums, each commutator means comprising a first electrically conductive surface, and a third electrically conductive surface constituting a null strip, said three surfaces being electrically isolated from one another, the conducting surfaces of said commutator means of the drum of highest order being so arranged as to produce the selection of the direction of rotation of said drum which will cause a preselected brush to contact the null strip on said drum via the shorter path around the periphery of said drum; multiple brush means contacting said commutator means on each said drum, said brush means comprising a brush corresponding to each digit in the order represented by each said drum; circuit means including a power source, a single preselected brush from each of the multiple brush means associated with each of said drums, one of said electrically conductive commutator surfaces on the drum of highest order, control means for energizing and causing the rotation of said motor means in one direction when said first conductive surface of said drum of highest order is included in said circuit and rotation in the opposite direction when said second conductive surface is included in said circuit, the direction of rotation being such as to cause a brush on said drum of highest order to approach its null strip without making contact with the other of said first and second commutator surfaces thereon, contact of each of said preselected brushes with the null strip of its associated drum introducing into said circuit serially, starting with the drum of highest order, one of the commutator surfaces of the drum of immediately lower order, said circuit being operative to stop the rotation of said motor means when each of said preselected brushes is in electrical contact with the null strip in the commutator means of its associated drum; and selector means for inserting into said circuit means, a single selected brush in each order corresponding to a digit of a preselected number representing a desired position of said shaft.

2. The digital servomechanism of claim 1 in which the commutator means of at least one drum additionally comprises fourth and fifth electrically conductive surfaces electrically insulated from said first, second, and third surfaces, said fourth and fifth surfaces being arranged on either side of said null strip, whereby a brush approaching said null strip must first contact one of said fifth and sixth surfaces, and a second control circuit including one of the brush means of said one drum, said power source and said motor means, which circuit is energized by contact of a brush with either of said fourth and fifth conductive surfaces to decrease the speed at which said motor means rotates the drums of said servomechanism.

3. The digital servomechanism of claim 1 in which said circuit means is provided with means to continue rotation of said motor means past the point at which all of said preselected brushes contact a null strip, and thereafter to reverse the direction of rotation of said motor means and reduce the speed thereof in order to back into null at a reduced speed.

4. The digital servomechanism of claim 1 which is provided with switch means interconnected with said drum of highest order by intermittent gear means, said switch being actuated on the completion of one full revolution of said drum of highest order and when actuated being effective to reverse the direction of rotation of said motor means.

5. In a digitalizer, a plurality of drums, each of said drums being mounted for rotation about its axis to a plurality of discrete positions with consecutive positions differing by a constant angular displacement, the consecutive discrete positions of a drum representing consecutive digits within an order of digits, each such drum representing a different order; intermittent gear means interconnecting drums of adjacent orders for causing a drum to index from one of its discrete positions to a next adjacent position on every full rotation of the drum of immediately lower order; commutator means carried on the surface of each of said drums, each commutator means comprising a first electrically conductive surface, a second electrically conductive surface, a third electrically conductive surface constituting a null strip, fourth and fifth electrically conductive surfaces arranged one on either side of said null strip, whereby a brush approaching said null strip must first contact one of said fourth or fifth surfaces, all of said surfaces being electrically isolated from one another; and multiple brush means contacting said commutator means on each said drum, said brush means comprising a brush corresponding to each digit in the order represented by each said drum.

6. In a digital servomechanism, a plurality of drums, each of said drums being mounted for rotation about its axis to a plurality of discrete positions with consecutive positions differing by a constant angular displacement, the consecutive discrete positions of a drum representing consecutive digits within an order of digits, each such drum representing a different order; intermittent gear means interconnecting drums of adjacent orders for causing a drum to index from one of its discrete positions to a next adjacent position on every full rotation of the drum of immediately lower order; a rotatable shaft the angular position of which within a plurality of rotations thereof is represented by a multiple digit number, each digit of which is contained within an order represented by one of said drums; motor means for rotation of said shaft in either direction, said motor being also operatively connected to the drum of lowest order to cause said drum to rotate when said motor means is energized and indirectly to cause the indexing of drums of higher order through the agency of said intermittent gear means interconnecting said drums; commutator means carried on the surface of each of said drums, each commutator means comprising a first electrically conductive surface and a second electrically conductive surface electrically isolated from the first, the drums of all orders higher than the lowest also carrying a third electrically conductive surface constituting a null strip, all of said surfaces being electrically isolated from one another; the conducting surfaces of said commutator means of the drum of highest order being so arranged as to produce the selection of the direction of rotation of said drum which will cause a preselected brush to contact the null strip on said drum via the shorter path around the periphery of said drum, multiple brush means contacting said commutator means on each said drum, said brush means comprising a brush corresponding to each digit in the order represented by each said drum; circuit means including a power source, a single preselected brush from each of the multiple brush means associated with each of said drums, one of said electrically conductive commutator surfaces on the drum of highest order, control means for energizing and causing the rotation of said motor means in one direction when said first conductive surface of said drum of highest order is included in said circuit and rotation in the opposite direction when said second conductive surface is included in said circuit, the direction of rotation being such as to cause a brush on said drum of highest order to approach its null strip without making contact with the other of said first and second commutator surfaces thereon, contact of each of said preselected brushes in drums of order higher than the lowest with the null strip of its associated drum introducing into said circuit serially, starting with the drum of highest order, one of the commutator surfaces of the drum of immediately lower order, said circuit being operative to stop the rotation of said motor means when each of said preselected brushes is in electrical contact with the null strip in the commutator means of its associated drum; and selector means for inserting into said circuit means, a single selected brush in each order corresponding to a digit of a preselected number representing a desired position of said shaft.

7. The digital servomechanism of claim 6 in which the drum of lowest order also carries a third electrically conductive surface constituting a null strip and said circuit means is provided with means to brake said rotatable shaft when said circuit is actuated by contact of each of its preselected brushes with the null strip of its associated drum.

8. In a digitalizer, a plurality of drums, each of said drums being mounted for rotation about its axis to a plurality of discrete positions with consecutive positions differing by a constant angular displacement, the consecutive discrete positions of a drum representing consecutive digits within an order of digits, each such drum representing a different order; intermittent gear means interconnecting drums of adjacent orders for causing a drum to index from one of its discrete positions to a next adjacent position on every full rotation of the drum of immediately lower order; switch means interconnected with the drum of highest order by intermittent gear means, said switch being actuated on the completion of one full revolution of said drum of highest order; commutator means carried on the surface of each of said drums, each commutator means comprising a first electrically conductive surface, a second electrically conductive surface, and a third electrically conductive surface, constituting a null strip, said three surfaces being electrically isolated from one another; and multiple brush means contacting said commutator means on each said drum, said brush means comprising a brush corresponding to each digit in the order represented by each said drum.

References Cited by the Examiner

UNITED STATES PATENTS

| | | | |
|---|---|---|---|
| 2,483,359 | 9/1949 | Bliss | 235—139 |
| 2,840,771 | 6/1958 | Kamm | 318—28 |
| 2,938,199 | 5/1960 | Berman | 340—347 |
| 3,025,509 | 3/1962 | Petherick | 340—347 |
| 3,141,160 | 7/1964 | Hartke et al. | 340—347 |

MAYNARD R. WILBUR, *Primary Examiner.*

A. L. NEWMAN, *Assistant Examiner.*